US011216289B2

(12) United States Patent
Gurtin et al.

(10) Patent No.: US 11,216,289 B2
(45) Date of Patent: *Jan. 4, 2022

(54) SYSTEM, METHOD, AND APPARATUS FOR BUILDING AND RENDERING A MESSAGE USER INTERFACE IN A GROUP-BASED COMMUNICATION SYSTEM

(71) Applicant: Slack Technologies, LLC, San Francisco, CA (US)

(72) Inventors: Liza Gurtin, San Francisco, CA (US); Michael Hahn, San Francisco, CA (US); Maria-Ivmer Real Kalalang, San Francisco, CA (US); Elizabeth Catherine Harrigan, San Francisco, CA (US); Jammie Mountz, San Francisco, CA (US); Tianxuan Chen, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,713

(22) Filed: Feb. 22, 2021

(65) Prior Publication Data

US 2021/0200561 A1 Jul. 1, 2021

Related U.S. Application Data

(63) Continuation of application No. 15/978,013, filed on May 11, 2018, now Pat. No. 10,929,155.

(51) Int. Cl.
*G06F 9/451* (2018.01)
*G06F 9/448* (2018.01)
*H04L 12/58* (2006.01)

(52) U.S. Cl.
CPC .............. *G06F 9/451* (2018.02); *G06F 9/448* (2018.02); *H04L 51/10* (2013.01)

(58) Field of Classification Search
None
See application file for complete search history.

(56) References Cited

U.S. PATENT DOCUMENTS

| 8,290,905 | B1 | 10/2012 | Little et al. |
| 8,683,322 | B1 | 3/2014 | Cooper |
| 10,348,655 | B1 | 7/2019 | Suhail et al. |
| 2009/0125593 | A1 | 5/2009 | Hiir et al. |

(Continued)

FOREIGN PATENT DOCUMENTS

GB 2324627 A 10/1998

OTHER PUBLICATIONS

"Die, Email, Die! A Flickr Cofounder Aims To Cut Us All Some Slack", ReadWriteWeb, LexisNexis, www.advance.lexis.com/api/permalink/33dd79e2-90f5-409d-ae27-5a2c7e86bf31/?context=1000516. (dated Aug. 14, 2013, 4:15 PM) 2 pages.

(Continued)

*Primary Examiner* — Ryan Barrett
(74) *Attorney, Agent, or Firm* — Morrison & Foerster LLP

(57) ABSTRACT

Embodiments of the present disclosure provide methods, systems, apparatuses, and computer program products for building and rendering a message user interface (UI) within a group-based communication interface of a group-based communication system, where the message UI is rendered to a client device based on a customizable block configuration and on customizable block data that is received from an external application.

20 Claims, 6 Drawing Sheets

(56) References Cited

U.S. PATENT DOCUMENTS

| | | | |
|---|---|---|---|
| 2014/0033171 | A1 | 1/2014 | Lorenz et al. |
| 2014/0089827 | A1 | 3/2014 | Gu et al. |
| 2014/0201675 | A1 | 7/2014 | Joo et al. |
| 2016/0218998 | A1 | 7/2016 | Sheth |
| 2016/0357374 | A1 | 12/2016 | Swink et al. |
| 2017/0262437 | A1 | 9/2017 | Raichelgauz et al. |
| 2018/0012232 | A1 | 1/2018 | Sehrawat et al. |
| 2018/0113609 | A1 | 4/2018 | Gnedin et al. |
| 2018/0287982 | A1 | 10/2018 | Draeger et al. |
| 2018/0367484 | A1 | 12/2018 | Rodriguez et al. |
| 2019/0190865 | A1 | 6/2019 | Jeon et al. |
| 2019/0356615 | A1 | 11/2019 | Suhail et al. |
| 2019/0356616 | A1 | 11/2019 | Suhail et al. |
| 2019/0356700 | A1 | 11/2019 | Suhail et al. |
| 2019/0377989 | A1 | 12/2019 | Dizengof et al. |
| 2020/0127951 | A1 | 4/2020 | Shah et al. |

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, LexisNexis, www.advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", Tedium, [online][retrieved May 9, 2019]. Retrieved from the Internet: www.tedium.co/2017/10/17/irc-vs-slack-chat-history/. (dated Oct. 17, 2017) 13 pages.

Gurtin et al., U.S. Office Action dated May 26, 2020 directed to U.S. Appl. No. 15/978,013; 29 pages.

International Search Report and Written Opinion dated Jul. 15, 2019, directed to International Application No. PCT/US19/31247; 16 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, LexisNexis, www.advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), LexisNexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019], Retrieved from the Internet: www.rfc-editor.org/rfc/rfc1459.txt. (dated May 1993) 57 pages.

Rebecca Walberg, "Email biggest office waste of time: survey", National Post, At FP10, LexisNexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

Extended Search Report dated May 14, 2021, directed to EP Application No. 19799210.0; 11 pages.

Office Action dated Jun. 22, 2021, directed to JP Application No. 2020-560918; 6 pages.

SYSTEM, METHOD, AND APPARATUS FOR BUILDING AND RENDERING A MESSAGE USER INTERFACE IN A GROUP-BASED COMMUNICATION SYSTEM

CROSS-REFERENCE TO RELATED APPLICATIONS

This application is a continuation of U.S. application Ser. No. 15/978,013, filed May 11, 2018, the entire contents of which are incorporated herein by reference.

BACKGROUND

Various messaging systems are available that allow an external application developer to build and render a message user interface (UI). Applicant has identified a number of deficiencies and problems associated with conventional message UI building and rendering implementations in messaging systems. Through applied effort, ingenuity, and innovation, many of these identified problems have been solved by developing solutions that are included in embodiments of the present disclosure, many examples of which are described in detail herein.

BRIEF SUMMARY

Various embodiments of the present invention are directed to an apparatus configured for building and rendering a message UI within a group-based communication interface of a group-based communication system. In one embodiment, a computing entity or apparatus is configured to receive, from an external application, user message data associated with a group-based communication interface to be rendered to a client device. The apparatus is further configured to parse the user message data to identify a message UI triggering event, where the message UI triggering event is associated with the client device. In circumstances where the message UI triggering event is identified among the user message data, the apparatus is further configured to determine, based on the message UI triggering event, a customizable block configuration to define the message UI that is rendered within the group-based communication interface. The apparatus is further configured to transmit a customizable block request to the external application associated with the customizable block configuration. The apparatus is further configured to receive customizable block data from the external application associated with the customizable block request. Further, the apparatus is configured to render the message UI within the group-based communication interface based on the customizable block configuration and on the customizable block data.

The customizable block configuration optionally comprises a plurality of blocks, where each block comprises a plurality of elements. The customizable block request is optionally configured to comprise a plurality of block types, where each block type is associated with a respective block within the customizable block configuration. The customizable block data received from the external application optionally comprises a plurality of block arrays. Each block array is associated with a respective block type and comprises a plurality of element values, where each element value is associated with an element attribute.

The apparatus is optionally configured to render the message UI within the group-based communication interface based on the customizable block configuration and the plurality of block arrays.

In one embodiment, the block type is optionally configured to comprise a text block type, a thumbnail block type, a divider block type, an image block type, a video block type, a meta block type, an action block type, a poll block type, a file block type, or a call block type. The text block type is optionally associated with a text element, the thumbnail block type is optionally associated with an image element, the divider block type is optionally associated with a divider element, the image block type is optionally associated with an image element or a text element, the video block type is optionally associated with a video element, the meta block type is optionally associated with an image element or a text element, the action block type is optionally associated with a button element, a dropdown menu element or an overflow menu element, the poll block type is optionally associated with an image element or a text element, the file block type is optionally associated with an image element or a text element, and the call block type is optionally associated with a button element.

In another embodiment, the each of the button element, the dropdown menu element, or the overflow menu element is optionally associated with a plurality of action element attributes comprising a color attribute or an action text attribute. The image element is optionally associated with a plurality of image element attributes comprising a size attribute.

Other embodiments include corresponding systems, methods, and computer programs, configured to perform the operations of the apparatus, encoded on computer storage devices. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
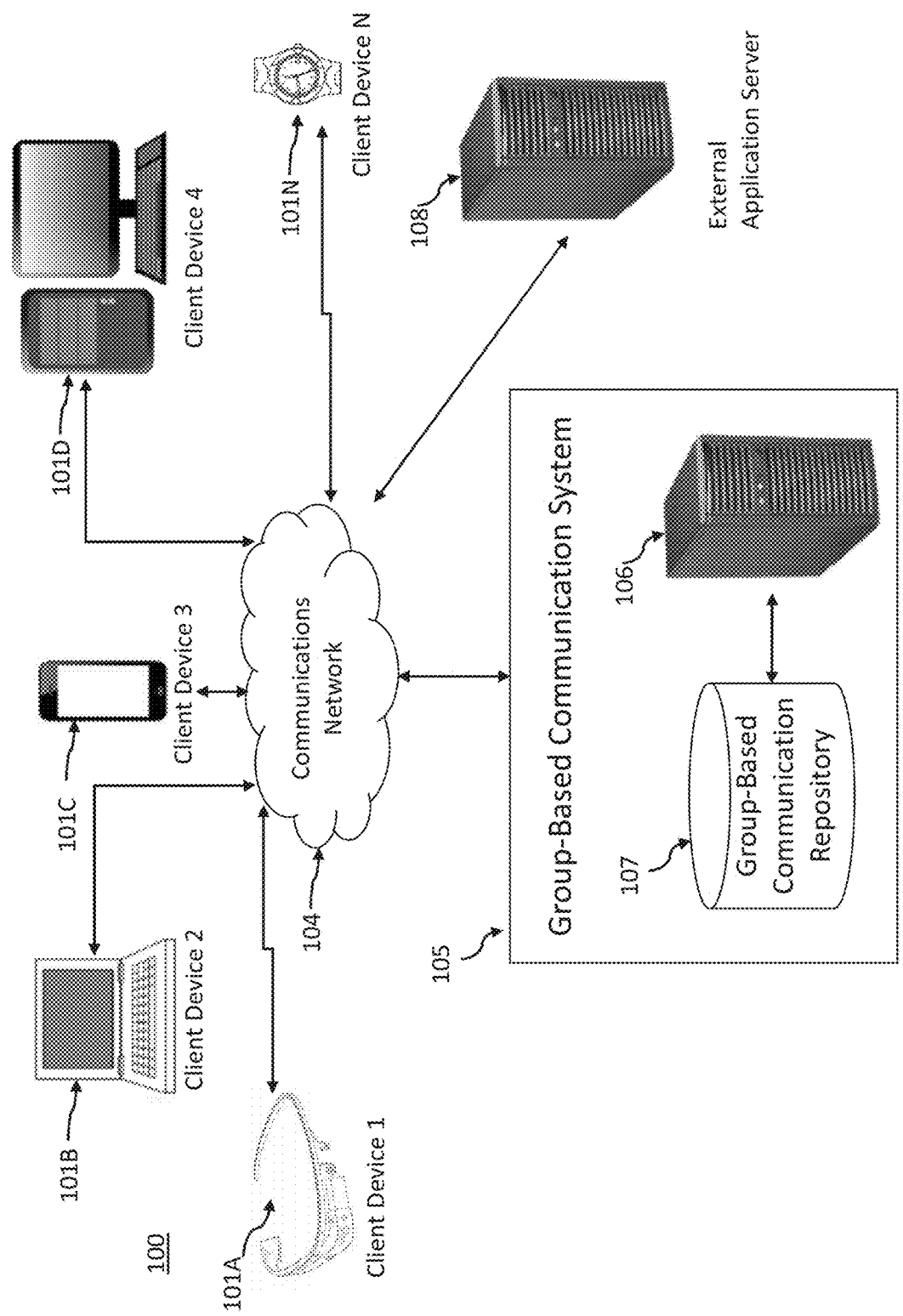
Figure 2:
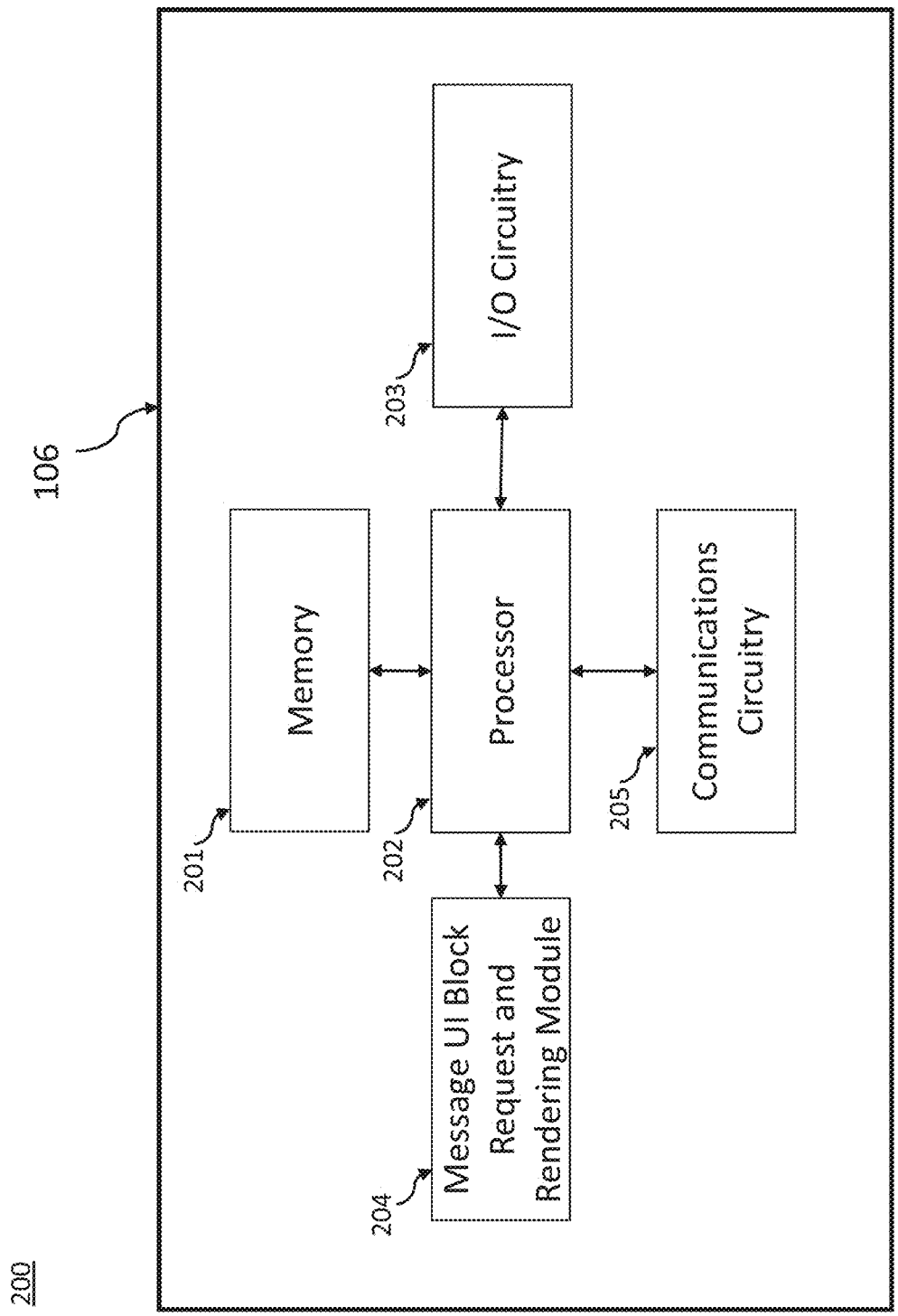
Figure 3:
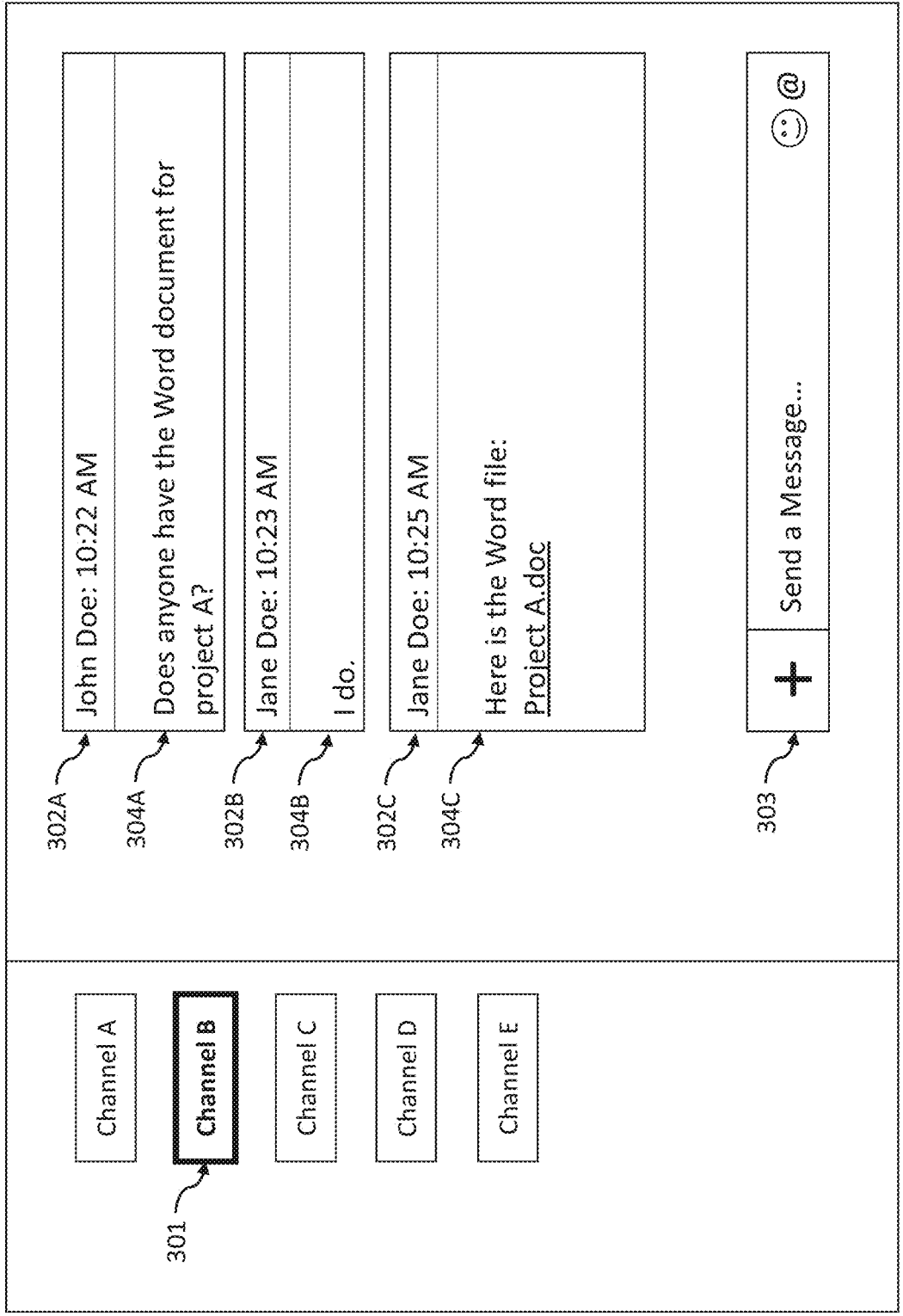
Figure 4:
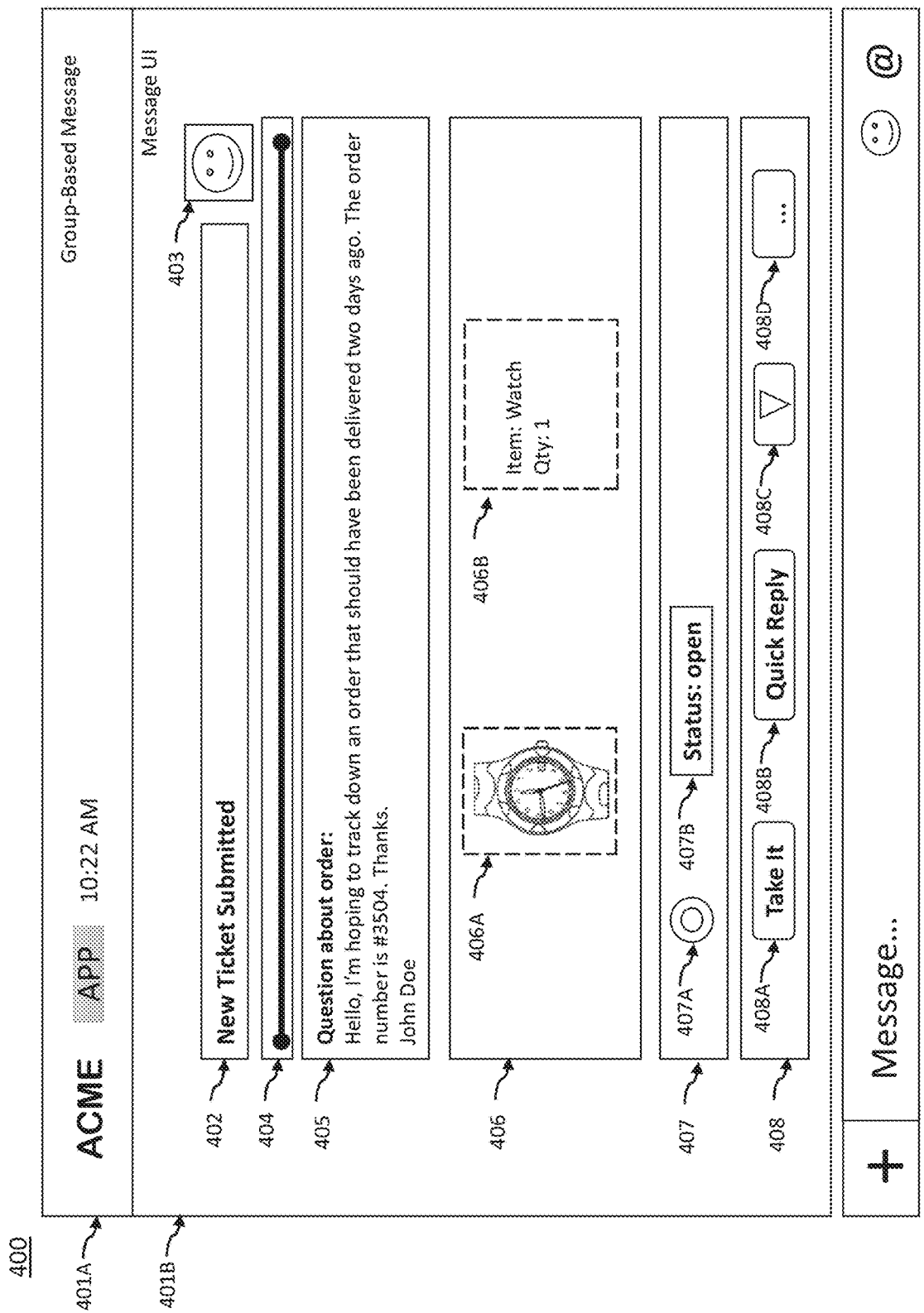
Figure 5:
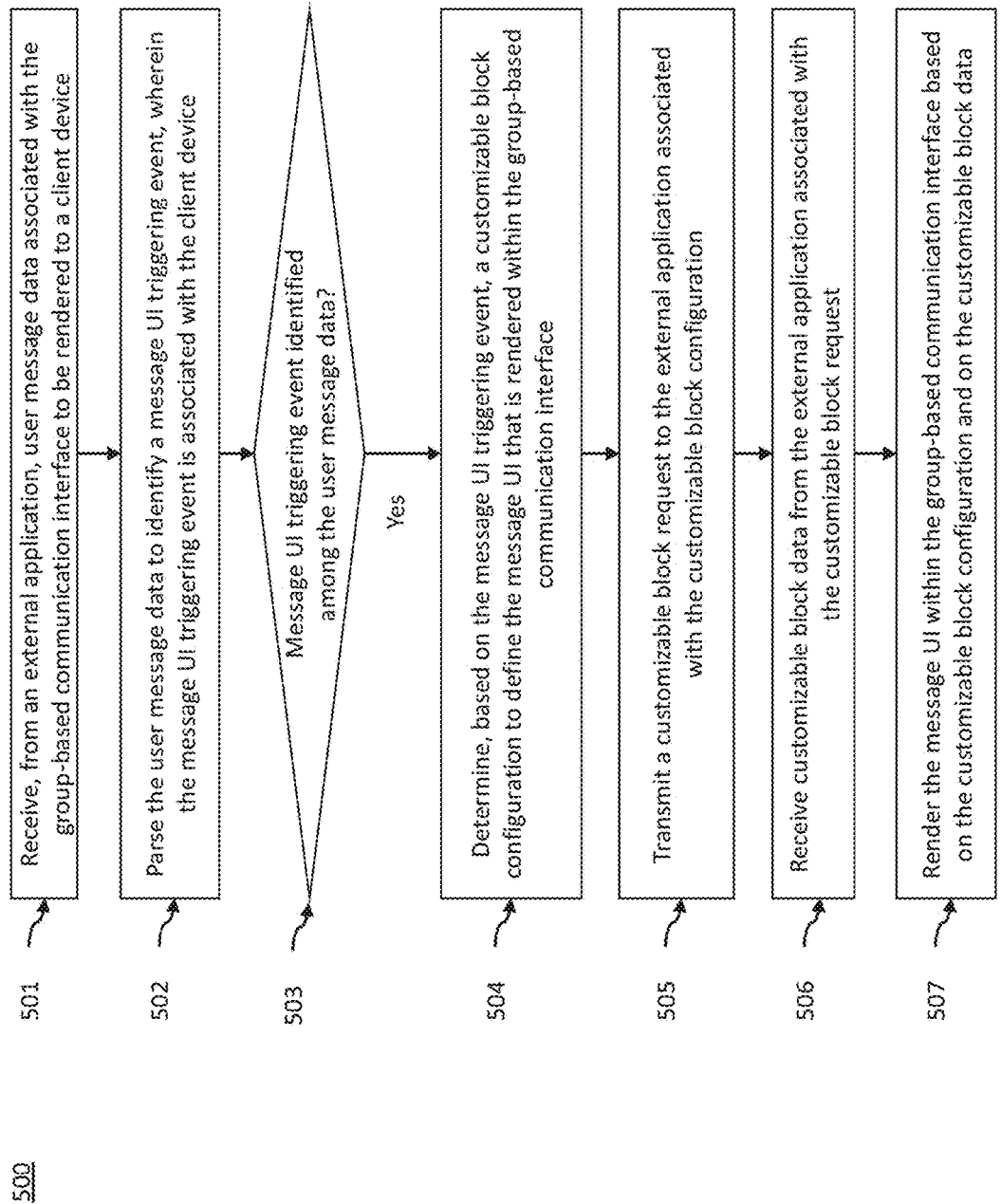
Figure 6:
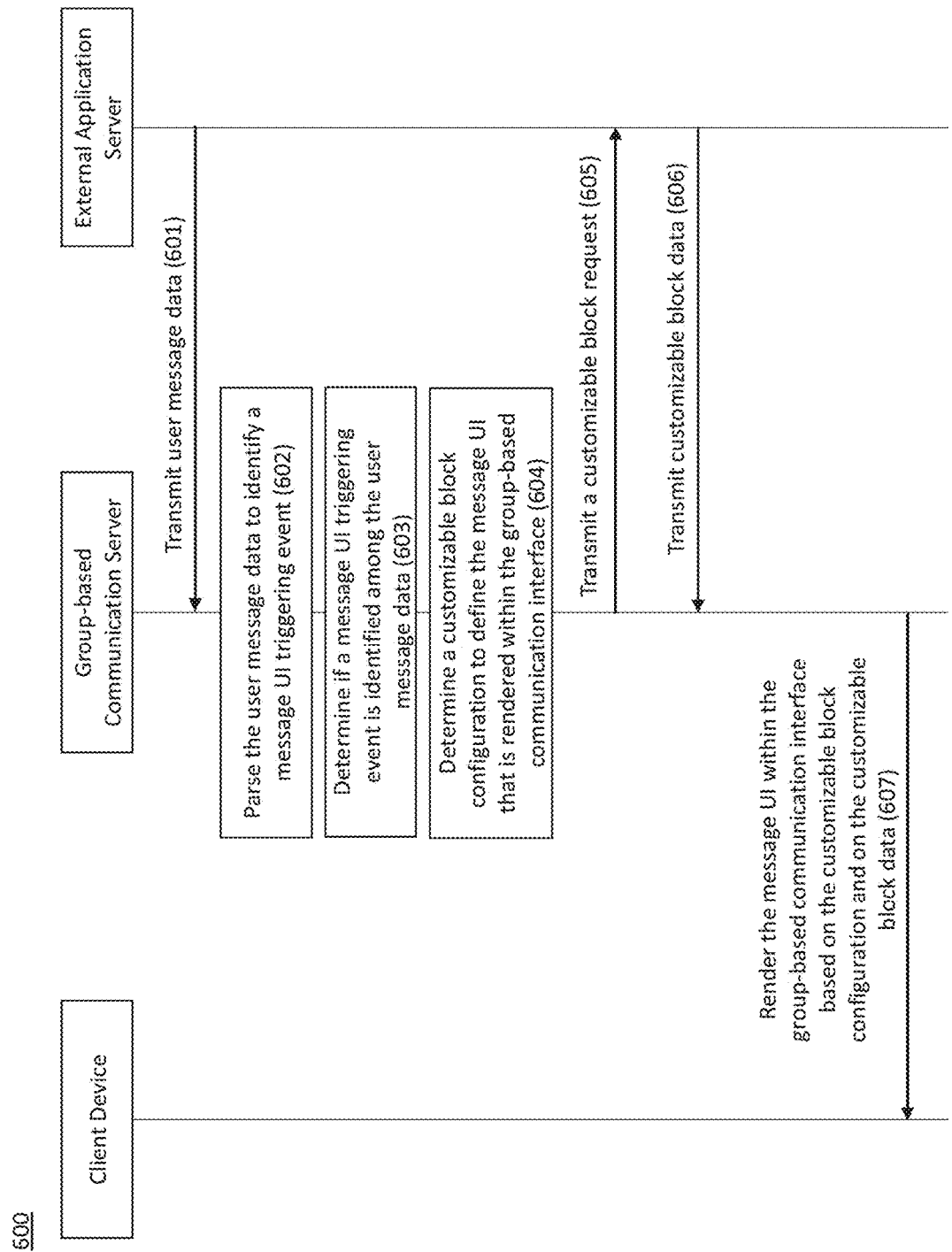

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2 is an exemplary schematic diagram of a group-based communication server according to one embodiment of the present disclosure;

FIG. 3 illustrates exemplary message UIs rendered within a group-based communication interface associated with a group-based communication channel according to one embodiment of the present disclosure;

FIG. 4 illustrates an exemplary customizable block configuration defining a message UI that is rendered within a group-based communication interface according to one embodiment of the present disclosure;

FIG. 5 illustrates an exemplary flow diagram for building and rendering a message UI within a group-based communication interface according to one embodiment of the present disclosure; and FIG. 6 illustrates an exemplary message UI building and rendering process executed by a client device, a group-based communication server, and an external application server according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a method for building and rendering a message UI within a group-based communication interface of a group-based communication system. According to the present disclosure, a message UI is generated for displaying device rendered objects associated with a client device in a block-based manner. In embodiments, an external application developer may build the message UI with block kits provided by a group-based communication server via transmitting customizable block data to the server. Through receiving customizable block data from an external application server and determining a customizable block configuration to define the message UI, the message UI may be generated and rendered to the client device associated with the external application.

In the present disclosure, the block kits may provide multiple block types and different elements associated with each block type. Based on the provided block kits, the external application developer may determine each element value for designing how an element may be rendered within each block. The customizable block configuration may serve as a foundation or a template for an external application developer to build the message UI. Therefore, the external application developer may have a certain degree of autonomy to build its desired message UI. The block kits provided by the group-based communication server may provide a certain counterbalance to that autonomy in that such kits define the general parameters or blocks that may be used to build message UIs. This allows a group-based communication system to address a difficult technical problem by providing real-time external application autonomy with respect to message UI content while ensuring a generally consistent user experience.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and external application servers.

The term "group-based communication interface" refers to a virtual communications environment configured to facilitate user interaction with a group-based communications system. Each group-based communication interface is accessible and viewable to a selected group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display group-based messages posted by channel members (e.g., validated users accessing the environment using client devices) that are viewable only to the members of the group. The format of the group-based communication channel may appear differently to different members of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel (i.e., group-based messages) will not vary per member of the group-based communication channel.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

The terms "organization identifier" or "business identifier" refer to one or more items of data by which an organization entity or a business entity (e.g., employees of each company may be a separate organization/business) within a group-based communication system may be identified. For example, an organization identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, one or more organization identifiers for organizations with which the user is associated, an indication as to whether the user is an owner of any group-based communication channels, an indication as to whether the user has any group-based communication channel restrictions, a plurality of messages, an emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the terms "group-based message" and "message" refer to any electronically generated device rendered objects provided by a user using a client device and that is configured for display within a group-based communication channel. Message communications may include any text, image, video, audio or combination thereof provided by a user (using a client device). For instance, the user may provide a group-based message that includes text as well as an image and a video within the group-based message as message contents. In such a case, the text, image, and video would comprise the group-based message or device rendered object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Group-based communication system users are organized into organization groups (e.g., employees of each company may be a separate organization group) and each organization group may access a group-based communication interface having one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "user message data" refers to data generated by an external application based on messages to be rendered to one or more of the client devices. For example, user message data may be generated by an external application based on group-based messages or other attachments associated with the group-based messages to be rendered within a group-based communication interface to be rendered to a client device. In some examples, user message data may include images, files, objects, or text that the external application intends that a user of the group-based communication system view in a message UI.

The term "external application" refers to a software program, platform, or service that is configured to communicate with the group-based communication system for providing service to a client device via a group-based communication interface. The external application operates on a compiled code base or repository that is separate and distinct from that which supports the group-based communication system. In some embodiments, the external application may communicate with the group-based communication system, and vice versa, through one or more application program interfaces (APIs). In some embodiments, the external application receives tokens or other authentication credentials that are used to facilitate secure communication between the external application and the group-based communication system in view of group-based communication system network security layers or protocols (e.g., network firewall protocols). Once connected with the remote networked device, the external application may transmit messages through the group-based communication system to a targeted client device.

The term "device rendered object" may be used to refer to a set of data and executable instructions that, when received and executed by a processor of a computing entity, render an object or interface for display that is engageable by the user of the computing entity.

As used herein, the term "message user interface (UI)" refers to an electronically generated platform that, when rendered for display on a client device, provides device rendered objects associated with a message communicated within the group-based communication system. The message UI enables a user operating the client device to interact or communicate with a server, a processing device, a program, or an external application provided in a group-based communication channel of a group-based communication system. For example, the message UI may be in a form of an attachment that is attached to a message communicated within a group-based communication channel. In such an example, the message UI may be displayed under the message enabling a user operating the client device to interact or communicate with a server, a processing device, a program, or an external application associated with the message. In another example, the message UI may be in the form of a threaded message that is attached to a topic thread. In another example, the message UI may be mounted within a user dashboard for rendering a user profile or user account details.

The term "message user interface (UI) triggering event" refers to an action, incident, collection of steps, or processes executed, via an external application, by an external application developer for building and rendering a message UI within a group-based communication interface associated with one or more client devices, where the message UI triggering event is identifiable by a server and may be correlated to one or more client devices. Triggering events may be pre-defined (e.g., button clicks, slash commands, etc.) or may be learned by the group-based communication system over time using machine learning models or other similar techniques. In exemplary embodiments, once a message UI triggering event is identified, the group-based communication server is configured to transmit a customizable block request to an external application associated with the message UI triggering event and/or any respectively correlated message UI building request.

As used herein, the term "customizable block configuration" refers to an electronically generated template of a message UI within a group-based communication interface. A customizable block configuration comprises multiple designated sections/blocks that are used for displaying device rendered objects in a section-based/block-based manner. A customizable block configuration may divide a message UI into designated sections/blocks that, when rendered for display on a client device, each designated section/block may provide corresponding device rendered objects. For example, a customizable block configuration may comprise customizable blocks allowing an external application developer using a client device to build a message UI by setting different element values (defined below) for different element attributes (defined below) associated with each block. For example, a customizable block configuration may allow an external application developer using a client device to select the style, number, or the display order of the elements associated with each block to be rendered for display within the message UI.

As used herein, the term "customizable block request" refers to an electronically generated request from a group-based communication server for building a customizable block of a message UI within a group-based communication interface of a group-based communication system and rendering for display on client devices associated with the group-based communication interface. A customizable block request may include a block type (defined below) to identify what type of block to be rendered to the client device associated with the group-based communication interface.

As used here, the term "customizable block data" refers to any data, data set, or data package that is sent from an external application and may be used by a group-based communication server of a group-based communication system for rendering a message UI within a group-based communication interface associated with a client device. For example, the customizable block data may comprise multiple block arrays, where each block array is associated with a respective block to be rendered for display within the message UI.

As used here, the term "block" refers to a designated section or area within a group-based communication interface that is used for displaying certain device rendered objects. The device rendered objects to be displayed within a block may be associated with the block type (defined below) of the block.

As used herein, the term "block type" refers to any data, data set, or data package for identifying what type of blocks within a message UI an external application developer would like to build and render for display on a client device. For example, a block type may be a "text block type" that is used to identify a text block the external application developer would like to build for displaying the text content. A block type may be a "thumbnail block type" that is used to identify a thumbnail block the external application developer would like to build for displaying the reduced-size versions of the image or video content. A block type may be a "divider block type" that is used to identify a divider block the external application developer would like to build for displaying the divider image content to separate different designated sections/blocks. A block type may be an "image block type" that is used to identify an image block the external application developer would like to build for displaying the image content. A block type may be a "video block type" that is used to identify a video block the external application developer would like to build for displaying the video content. A block type may be a "meta block type" that is used to identify a meta block the external application developer would like to build for displaying the metadata content. A block type may be an "action block type" that is used to identify an action block the external application developer would like to build for displaying action content (e.g., an accept/reject button, a dropdown menu button, an overflow menu button) and accepting actions initiated by client devices. A block type may be a "poll block type" that is used to identify a poll block the external application developer would like to build for displaying poll contents (e.g., different options for users to select) and accepting votes from client devices. A block type may be a "file block type" that is used to identify a file block the external application developer would like to build for displaying the file content shared between client devices. A block type may be a "call block type" that is used to identify a call block the external application developer would like to build for displaying the call content (e.g., a phone button for users to make a call). It will be appreciated that the block type may include other block types not described above.

As used herein, the term "elements" refers to electronically generated device rendered objects that are served as the smallest design units for building a block of a message UI. A block may comprise a plurality of elements that, when combined together, forms the block. For example, an element may be a "text element" that is provided for an external application developer to design how text content would be displayed within a block. An element may be an "image element" that is provided for an external application developer to design how image content would be displayed within a block. An element may be a "divider element" that is provided for an external application developer to design how divider content would be displayed within a block. An element may be a "video element" that is provided for an external application developer to design how video content would be displayed within a block. An element may be a "button element" that is provided for an external application developer to design how a button would be displayed within a block. An element may be a "dropdown menu element" that is provided for an external application developer to design how a dropdown menu would be displayed within a block. An element may be an "overflow menu element" that is provided for an external application developer to design how an overflow menu would be displayed within a block. It will be appreciated that the elements may include other elements not described above.

As used herein, the term "element attributes" refers to design features associated with an element such that the element, when rendered for display on a client device, reflects the features designed by an external application developer. For example, the term "size attribute" refers to a size feature for displaying an image element in a specific size. For another example, the term "color attribute" refers to a color feature for displaying a button element in a specific color. For another example, the term "action text attribute" refers to a text feature for displaying specific text associated with a button element, a dropdown menu element, or an overflow menu element within an action block type or a call block type. It will be appreciated that the element attributes may include other attributes not described above.

As used herein, the term "element values" refers to electronic generated values associated with element attributes of an element. An element value may be used to define an element attribute identifying how the element may be displayed within the block comprising the element, so as to reflect an element feature designed by an external application developer.

As used herein, the term "block array" refers to a collection of element values (defined above) associated with a block type. A block array may comprise a plurality of element values, where each element value defining an attribute associated with a corresponding element to be displayed within the block associated with the block type.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. An external application server 108 may interact with a group-based communication system 105 via a communications network 104. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N or external application server 108. For example, the group-based communication server 106 may be operable to receive and post or transmit group-based messages provided by the client devices 101A-101N. For another example, the group-based communication server 106 may be operable to receive user message data provided by external application server, for building and rendering a message UI to client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or group-based message may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>NickName.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
```

-continued

```
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1 </team_identifier>
        <channelidentifier>ID_channel_1 </channel_identifier>
        <contents>That is an interesting invention. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
```

```
</responses>
<contents>That is an interesting invention. I have attached a copy our patent policy.</contents>
<attachments>patent_policy.pdf</attachments>
<conversation_primitive>
   conversation includes messages: ID_message_8, ID_message_9, ID_message_10,
   ID_message_11, ID_message_12
</conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may channels associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

FIG. 2 illustrates an exemplary schematic diagram of a group-based communication server 200 that may be embodied by one or more computing systems. The group-based communication server 200 may include a processor 202, a memory 201, input/output circuitry 203, communications circuitry 205, and message UI block request and rendering module 204. The group-based communication server 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the group-based communication server 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the group-based communication server 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication server 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The message UI block request and rendering module 204 includes hardware configured to support a group-based communication system. The message UI block request and rendering module 204 may utilize processing circuitry, such as the processor 202, to perform these actions. The message UI block request and rendering module 204 may send and/or receive data from group-based communication repository 107. In some implementations, the sent and/or received data may be of enterprise-based digital content objects organized among a plurality of group-based communication channels. It should also be appreciated that, in some embodiments, the message UI block request and rendering module 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Building and Rendering a Message User Interface (UI) within a Group-Based Communication Interface In the present disclosure, the block kit structure or block kits are provided via the operation of the group-based communication server 106. The block kit structure or block kits may be associated with a variety of block types, such as a text block type, a divider block type, an action block type, etc., for an external application developer to pick and choose blocks desired to be rendered within a message UI. In embodiments, each block type is further defined by multiple elements, where different element values for each element may be set by the external application developer. Based on the block kit structure or block kits provided by the group-based communication system, the external application developer may design a customizable block configuration for building a desired message UI.

The customizable block configuration may serve as a foundation or a template for an external application developer to build the message UI. For example, an external application developer may determine to design a customizable block configuration, associated with a text block type, a divider block type, and an action block type, to be rendered for display within a message UI. In such an example, with respect to a text element associated with the text block, the external application developer may determine what text content to be rendered for display within the text block. With respect to a button element associated with the action block type, the external application developer may determine what color or what action text associated with the button to be rendered for display within the action block type. The above example shows that the external application developer may have a certain degree of autonomy to build a desired message UI using the block kit structure or block kits provided by the group-based communication system.

As a balance to the external application developer autonomy referenced above, the block kits defined by the group-based communication system also set certain limits regarding how the external application developer may build any desired message UI. In the above example, with respect to the text element associated with the text block, the external application developer may be restricted to determine what text font, size, or color to be rendered for display within the text block, but may only determine what text content to be displayed. With respect to the divider element associated with the divider block, the external application developer may also be restricted to set the size, color, or design pattern of the divider element for dividing different blocks. Balancing between the external application developer autonomy and restrictions defined by the group-based communication system ensures a consistent user experience for all message UIs communicated within the group-based communication system.

FIG. 3 illustrates exemplary message UIs rendered within a group-based communication interface 300 associated with a group-based communication channel according to one embodiment of the present disclosure. As described herein, group-based communication interface 300 is presented on a display of client devices 101A-101N. Group-based messages 302A-302C are rendered within the group-based communication interface 300 associated with a selected group-based communication channel 301 (Channel B). Each group-based message comprises group-based message information, which includes user information identifying a user who sent the group-based message, and a timestamp indicating when the group-based message was sent. Each group-based message may further comprise a message UI (e.g., 304A-304C) attached to the group-based message. The message UI may be built and rendered for display under the respective group-based message based on user message data.

In the exemplary embodiment, the group-based messages 302A-302C are uniformly rendered to each user viewing the group-based communication interface associated with the selected Channel B. For the purposes described herein, the user may interact or communicate with the group-based communication server 106 utilizing the message input field 303. And a message UI (e.g., 304A-304C) may be generated based on the user's interaction or communication with the group-based communication server 106. For example, the user, John Doe using a client device may input or enter "Does anyone have the Word document for project A?" into the message input field 303. And based on the content John Doe keyed or entered, a message UI 304A may be generated and rendered within the group-based communication interface 300 by way of attaching a text block under the user information or timestamp of the group-based messages 302A.

FIG. 4 illustrates an exemplary customizable block configuration defining a message UI that is rendered within a group-based communication interface 400 according to one embodiment of the present disclosure. In the embodiment, a group-based message 401A is generated and rendered for display within a group-based communication interface 400. The group-based message 401A may comprise information indicating what type of message is being generated (e.g., an application type of message associated with an external application as shown as APP in FIG. 4), which external application the message is associated with (e.g., ACME Customer Service application for providing customer service as shown in FIG. 4), or a timestamp regarding what time the message is being generated (e.g., 10:22 AM as shown in FIG. 4). An ACME Customer Service application developer may build a message UI 401B according to the exemplary embodiment of the present disclosure whenever a new ticket is submitted by a customer via the ACME Customer Service application.

In the embodiment, a message UI 401B built by an external application developer is attached to the group-based message 401A and rendered for display under the group-based message 401A. In the embodiment, the message UI 401B is defined by a customizable block configuration that comprises multiple blocks 402-408, where each block is associated with a respective block type and may comprise multiple elements.

For the ACME Customer Service example shown in FIG. 4, block 402 is associated with a text block that comprises a text element, where the text element is configured to display the following text content: "New Ticket Submitted." Block 403 is associated with a thumbnail block type that comprises an image element, where the image element is configured to display a reduced-size picture or video for identifying a consumer account. Block 404 is associated with a divider type that comprises a divider element for dividing different blocks. Block 405 is associated with a text block type that comprises a text element, where the text element is configured to display text content related to a placed order at issue. Block 406 is associated with an image block type that may comprise an image element 406A or a text element 406B related to the placed order at issue. For example, the image element 406A in FIG. 4 is configured to display an image of a watch associated with the order at issue. The text element 406B is configured to display text content associated with an item name or a quantity number of the watch associated with the placed order at issue.

Block 407 is associated with a meta block type that may comprise an image element 407A or a text element 407B. For example, the image element 407A in FIG. 4 may be configured to display a sign showing that a new ticket is opened or closed. The text element 407B may be configured to display text content showing a current status of the ticket indicating whether the customer's submitted issue is resolved or not. Block 408 is associated with an action block type that comprises button elements 408A-408B, a dropdown menu element 408C, or an overflow element 408D for accepting actions initiated by a customer service staff. For example, the button element 408A may be configured to accept a clicking action when the staff decided to take this new ticket and clicked on the "Take It" button. The button element 408B may be configured to accept a clicking action when the staff decided to quickly reply to the ticket and clicked on the "Quick Reply" button. The dropdown menu element 408C and the overflow element 408D may be configured to accept a clicking action when the staff would like to examine and choose other actions in response to the submitted new ticket.

In the above embodiment, an external application developer may build and generate a customizable block configuration defining a message UI according to the exemplary embodiment of the present disclosure. Further, the external application developer may determine which blocks to be built in the message UI and which elements to be mounted in each block. In embodiments, each element of the blocks may be further associated with an element value for defining an element attribute. In embodiments, each element attribute is used to define how the element may be displayed within a group-based communication interface. Multiple element values associated with the same block may be combined to form a block array for defining a specific block within a message UI.

FIG. 5 illustrates an exemplary flow diagram for building and rendering a message UI within a group-based communication interface according to one embodiment of the present disclosure. The method 500 begins with receiving, from an external application, user message data associated with the group-based communication interface to be rendered to a client device (501). For example, user message data may be generated at the time an external application developer received a submitted new ticket via an external application and would like to build and render a message with a message UI to a client device.

The method 500 continues with parsing the user message data to identify a message UI triggering event (502). The message UI triggering event is associated with a client device. In embodiments, a group-based communication server may parse the user message data received from the external application. The group-based communication server may further, based on parsing the user message data, identify a message UI triggering event that is associated with a client device. For example, a new ticket submission event received from an ACME Customer Service application may be identified among the user message data and the new ticket submission may be associated with client devices used by employees of the ACME Customer Service.

The method 500 continues with determining whether the message UI triggering event is identified among the user message data (503). In circumstances where the message UI triggering event is identified among the user message data, the method 500 continues with determining, based on the message UI triggering event, a customizable block configuration to define the message UI that is rendered within the group-based communication interface (504). In embodiments, the group-based communication server may determine a customizable block configuration comprising multiple blocks to define a message UI. In such embodiments, the blocks defining the message UI rendered within the group-based communication interface may be determined based on the message UI triggering event. For example, the group-based communication server may determine a customizable block configuration comprising text blocks, image blocks, divider blocks, meta blocks, or action blocks that is associated with the new ticket submission event initiated by the ACME Customer Service application.

The method 500 further continues with transmitting a customizable block request to the external application associated with the customizable block configuration (505). For example, the group-based communication server may transmit a customizable block request to the ACME Customer Service application server associated with the customizable block configuration.

The method 500 further continues with receiving customizable block data from the external application associated with the customizable block request (506). For example, the group-based communication server may receive customizable block data from the ACME Customer Service application server. In such an example, the customizable block data may comprise a plurality of block arrays defined by the ACME Customer Service application developer. Each block array is associated with a respective block and comprises a plurality of element values. Each element value is further associated with an element attribute defining how the element should be rendered within the message UI. For example, the ACME Customer Service application developer may define an action block having button elements with different color and different action text displayed on the button. As shown in FIG. 4, the action block 408 may comprise different button elements with a first action text (e.g., "Take It") and a second action text (e.g., "Quick Reply") based on the design of the ACME Customer Service application developer. Similarly, the action block 408 may comprise button elements with different color.

Finally, the method 500 further continues with rendering the message UI within the group-based communication interface based on the customizable block configuration and on the customizable block data (507).

FIG. 6 illustrates an exemplary message UI building and rendering process executed by a client device 101A-101N, a group-based communication server 106, and an external application server 108 according to one embodiment of the present disclosure.

An external application server (e.g., external application server 108 shown in FIG. 1) may be configured to transmit user message data to a group-based communication server (e.g., group-based communication server 106 shown in FIG. 1) (601). The group-based communication server 106 may parse the user message data to identify a message UI triggering event (602). Afterwards, the group-based communication server 106 may determine if a message UI triggering event is identified among the user message data (603). In circumstances where the message UI triggering event is identified among the user message data, the group-based communication server 106 may further determine a customizable block configuration to define the message UI that is rendered within the group-based communication interface (604). In embodiments, the customizable block configuration may comprise multiple blocks, where each block may comprise a plurality of elements. The group-based communication server 106 may be configured to transmit a customizable block request to the external application server (e.g., external application server 108 shown in FIG. 1) (605). In embodiments, the customizable block request may comprise a plurality of block types, where each block type is associated with a respective block within the customizable block configuration. The external application server 108 may be configured to transmit a customizable block data in response to the customizable block request (606). In embodiments, the customizable block data may comprise a plurality of block arrays, where each block is associated with a respective block type and comprises a plurality of element values. In embodiments, each element value is associated with an element attribute indicating how an element is rendered within the group-based communication interface. The group-based communication server 106 may render, on the client device (e.g., client devices 101A-101N shown in FIG. 1), the message UI within the group-based communication interface based on the customizable block configuration and on the customizable block data (607).

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A group-based communication server system for building and rendering a message user interface (UI) within a group-based communication interface of a group-based communication system, the server system comprising at least one processor and at least one memory including computer program code, the at least one memory and the computer program code configured to, with the at least one processor, cause the server system to:
receive, from an external application, user message data associated with the group-based communication interface to be rendered to a client user;
determine, based on the user message data, a customizable block configuration to define a message UI that is rendered within the group-based communication interface,
transmit a customizable block request to the external application associated with the customizable block configuration,
receive customizable block data from the external application associated with the customizable block request, and
transmit, to the client user, data for rendering the message UI within the group-based communication interface based on the customizable block configuration and on the customizable block data.

2. The server system of claim 1, wherein the customizable block configuration comprises a plurality of blocks, each block comprising a plurality of elements.

3. The server system of claim 2, wherein the customizable block request comprises a plurality of block types, each block type associated with a respective block within the customizable block configuration.

4. The server system of claim 3, wherein the customizable block data received from the external application comprises a plurality of block arrays, each block array associated with a respective block type and comprising a plurality of element values, wherein each element value is associated with an element attribute.

5. The server system of claim 3, wherein the plurality of block types comprises a text block type, a thumbnail block type, a divider block type, an image block type, a video block type, a meta block type, an action block type, a poll block type, a file block type, or a call block type.

6. The server system of claim 5, wherein at least one of the thumbnail block type, the image block type, the meta block type, the poll block type, and the file block type is associated with an image element, and the image element is associated with a plurality of image element attributes comprising a size attribute.

7. The server system of claim 5, wherein at least one of the image block type, the meta block type, the action block type, the poll block type, and the file block type is associated with an image element or a text element.

8. The server system of claim 5, wherein the action block type is associated with a button element, a dropdown menu element, or an overflow menu element.

9. The server system of claim 8, wherein at least one of the button element, the dropdown menu element, or the overflow menu element is associated with a plurality of action element attributes comprising a color attribute and an action text attribute.

10. The server system of claim 5, wherein the call block type is associated with a button element.

11. A method for building and rendering a message user interface (UI) within a group-based communication interface of a group-based communication server system, the method comprising, at the server system:
receiving, from an external application, user message data associated with the group-based communication interface to be rendered to a client user;
determining, based on the user message data, a customizable block configuration to define a message UI that is rendered within the group-based communication interface,
transmitting a customizable block request to the external application associated with the customizable block configuration,
receiving customizable block data from the external application associated with the customizable block request, and
transmitting, to the client user, data for rendering the message UI within the group-based communication interface based on the customizable block configuration and on the customizable block data.

12. The method of claim 11, wherein the customizable block configuration comprises a plurality of blocks, each block comprising a plurality of elements.

13. The method of claim 12, wherein the customizable block request comprises a plurality of block types, each block type associated with a respective block within the customizable block configuration.

14. The method of claim 13, wherein the customizable block data received from the external application comprises a plurality of block arrays, each block array associated with a respective block type and comprising a plurality of element values, wherein each element value is associated with an element attribute.

15. The method of claim 13, wherein the plurality of block types comprises a text block type, a thumbnail block type, a divider block type, an image block type, a video block type, a meta block type, an action block type, a poll block type, a file block type, or a call block type.

16. The method of claim 15, wherein at least one of the thumbnail block type, the image block type, the meta block type, the poll block type, and the file block type is associated with an image element, and the image element is associated with a plurality of image element attributes comprising a size attribute.

17. The method of claim 15, wherein at least one of the image block type, the meta block type, the action block type, the poll block type, and the file block type is associated with an image element or a text element.

18. The method of claim 15, wherein the action block type is associated with a button element, a dropdown menu element, or an overflow menu element.

19. The method of claim 18, wherein at least one of the button element, the dropdown menu element, or the overflow menu element is associated with a plurality of action element attributes comprising a color attribute and an action text attribute.

20. The method of claim 15, wherein the call block type is associated with a button element.

* * * * *